United States Patent
Morimoto

(10) Patent No.: US 8,368,920 B2
(45) Date of Patent: Feb. 5, 2013

(54) IMAGE FORMING SYSTEM, RECORDING MEDIUM HAVING IMAGE FORMING PROGRAM RECORDED THEREON AND IMAGE FORMING APPARATUS FOR QUICKLY AVOIDING DUPLICATION

(75) Inventor: Tsuyoshi Morimoto, Itami (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1335 days.

(21) Appl. No.: 12/101,463

(22) Filed: Apr. 11, 2008

(65) Prior Publication Data

US 2009/0021782 A1   Jan. 22, 2009

(30) Foreign Application Priority Data

Jul. 18, 2007 (JP) ................................ 2007-186844
Jul. 18, 2007 (JP) ................................ 2007-187293

(51) Int. Cl.
*G06F 3/12* (2006.01)

(52) U.S. Cl. .................................................. 358/1.15

(58) Field of Classification Search ........................ None
See application file for complete search history.

(56) References Cited

U.S. PATENT DOCUMENTS

| | | |
|---|---|---|
| 2002/0054351 A1 | 5/2002 | Kageyama et al. |
| 2003/0231320 A1 | 12/2003 | Tsunekawa |
| 2006/0059271 A1 | 3/2006 | Kato |
| 2009/0033975 A1 | 2/2009 | Sakai |

FOREIGN PATENT DOCUMENTS

| | | |
|---|---|---|
| JP | 10-143638 A | 5/1998 |
| JP | 11-184661 | 7/1999 |
| JP | 2002-029100 | 1/2002 |
| JP | 2002-351634 A | 12/2002 |
| JP | 2003-039771 | 2/2003 |
| JP | 2003-76519 A | 3/2003 |
| JP | 2003-237147 | 8/2003 |
| JP | 2003-248570 A | 9/2003 |
| JP | 2003-312068 | 11/2003 |
| JP | 2004-188618 | 7/2004 |
| JP | 2005-343034 | 12/2005 |
| JP | 2006-072964 | 3/2006 |
| JP | 2006-164152 | 6/2006 |

(Continued)

OTHER PUBLICATIONS

An English Translation of the Final Decision for Rejection issued in the corresponding Japanese Patent Application No. 2007-187293 dated Dec. 22, 2009.

(Continued)

*Primary Examiner* — Benny Q Tieu
*Assistant Examiner* — Jeremiah Bryar
(74) *Attorney, Agent, or Firm* — Buchanan Ingersoll & Rooney PC

(57) ABSTRACT

An image forming system includes an information terminal and an image forming apparatus. The image forming apparatus stores a hash value of a file on which image forming operation is to be performed or has been performed. Upon a request to print a predetermined file at the information terminal, the information terminal generates a hash value of the predetermined file. The information terminal transmits print data and the hash value to the image forming apparatus only in the case where the information terminal determines that hash values stored by the image forming apparatus do not include the generated hash value.

22 Claims, 11 Drawing Sheets

FOREIGN PATENT DOCUMENTS

| | | | |
|---|---|---|---|
| JP | 2006164152 | * | 6/2006 |
| JP | 2006-228062 | | 8/2006 |
| JP | 2006-239932 A | | 9/2006 |
| JP | 2006-301856 | | 11/2006 |
| JP | 2007-079902 | | 3/2007 |
| JP | 2007-090756 | | 4/2007 |

OTHER PUBLICATIONS

Notice of Grounds of Rejection in JP 2007-186844 dated Jun. 2, 2009, and an English Translation thereof.

Notice of Grounds of Rejection in JP 2007-187293 dated Jun. 16, 2009, and an English Translation thereof.

* cited by examiner

IMAGE FORMING SYSTEM, RECORDING MEDIUM HAVING IMAGE FORMING PROGRAM RECORDED THEREON AND IMAGE FORMING APPARATUS FOR QUICKLY AVOIDING DUPLICATION

This application is based on Japanese Patent Applications Nos. 2007-186844 and 2007-187293 filed with the Japan Patent Office on Jul. 18, 2007, the entire content of which is hereby incorporated by reference.

BACKGROUND OF TH INVENTION

1. Field of the Invention

The present invention relates to image formation, and particularly to an image forming system, a recording medium on which an image forming program is recorded and an image forming apparatus, which can avoid duplicated image formation by the image forming apparatus.

2. Description of the Related Art

There has been a conventional technique with which an image forming apparatus is provided on a network, print data and print setting information are transmitted from a terminal connected to the network to the image forming apparatus, and the image forming apparatus accordingly performs image forming operation (printing).

Further, as a storage device has a higher capacity in these years, there has also been found a technique with which print data for example is stored in a storage device of an image forming apparatus and the image forming apparatus performs image forming operation according to information about a newly transmitted instruction to print.

Such techniques including storage of print data for example in the storage device of the image forming apparatus are advantageous in that it is unnecessary to transmit print data for example in a printing process (image forming process), which can save some work of the user in the printing process. There could arise, however, the state where an enormous amount of data is stored in the storage device.

In order to avoid such a state as described above, a product has been developed that automatically erases data stored in the storage device for a predetermined period (three days for example) from the time when image forming operation is done.

Various techniques have also been disclosed for avoiding storage of the same data in a storage device. For example, according to a technique disclosed in Japanese Laid-Open Patent Publication No. 10-143638 (Document 1), in response to an instruction to output image data already stored in an image processing apparatus, the image processing apparatus outputs the stored image data. According to a technique disclosed in Japanese Laid-Open Patent Publication No. 2006-239932 (Document 2), in the case where data that is input to be processed by an image forming apparatus is data that has already been stored, the stored data is overwritten with the input data.

Further, a conventional technique is disclosed of taking an action to inhibit image forming operation for the same data. For example, according to a technique disclosed in Japanese Laid-Open Patent Publication No. 2003-076519 (Document 3), under the conditions that a printer receives a print job and the same print job as the received print job is stored in the printer, information about this status is given. According to a technique disclosed in Japanese Laid-Open Patent Publication Nos. 2002-351634 (Document 4) and 2003-248570 (Document 5), in the case where the same print jobs are supplied to a printer, control is done such that the later supplied print job is inhibited.

As described above, by avoiding storage of the same data or inhibiting printing of the same data, it seems that storage of redundant data in the storage device of the image forming apparatus can be appropriately avoided.

Depending on how it is determined that "these are the same data," however, accurate determination may not be made or the determination may take a long time, resulting in another problem that the user feels inconvenient. For example, if the whole image data to be printed out are compared with each other, a long time is consumed, which causes inconvenience for the user. In the case where only one of character data and image data are compared to determine whether they are the same data as disclosed in Document 5, it is determined that these data are the same image data even if the other of the character and image data are different, and thus accurate determination is not made.

Thus, the conventional techniques trying to avoid image formation of the same file in an image forming apparatus have the problem that whether or not these are the same data cannot be determined accurately or the determination takes a long time.

SUMMARY OF THE INVENTION

The present invention has been made in view of the above-described circumstances and an object of the invention is to avoid, with reliability and in a short period of time, forming an image of the same file by an image forming apparatus on a network.

An image forming system according to the present invention includes an information terminal and an image forming apparatus connected to the information terminal via a network. The image forming apparatus includes a data storage unit storing a hash value of a file to be subjected to or having been subjected to image forming operation. The information terminal includes: an acceptance unit accepting a print request to print a predetermined file; a first generation unit generating print data for printing the predetermined file by the image forming apparatus; a second generation unit generating a hash value of the predetermined file; a determination unit making a determination as to whether or not hash values stored by the data storage unit include the hash value generated by the second generation unit; and a transmission unit transmitting the print data and the hash value to the image forming apparatus only in a case where the determination unit determines that the hash values stored by the data storage unit do not include the hash value generated by the second generation unit. The image forming apparatus further includes, a reception unit receiving the print data and the hash value, an image forming unit performing image forming operation based on the print data received by the reception unit; and a storage operation unit operating to store by the data storage unit the hash value received by the reception unit.

A recording medium of the present invention has an image forming program recorded thereon, and the program is executed by a computer connected via a network to an image forming apparatus storing a hash value of a file to be subjected to or having been subjected to image forming operation. The image forming apparatus executes the program to perform the steps of: accepting a print request to print a predetermined file; generating print data for printing the predetermined file by the image forming apparatus; generating a hash value of the predetermined file; making a determination as to whether or not hash values stored by the image forming apparatus include the generated hash value; and transmitting the print data and the hash value to the image forming apparatus only in a case where it is determined that the hash values stored by the image forming apparatus do not include the generated hash value.

An image forming apparatus of the present invention is connected via a network to an information terminal outputting a print request to print a predetermined file. The image forming apparatus includes: a data storage unit storing a hash value of a file to be subjected to or having been subjected to image forming operation; a reception unit receiving print data for printing the predetermined file and a hash value of the predetermined file transmitted from the information terminal; a storage operation unit operating to store by the data storage unit the received hash value; and an image forming unit performing image forming operation for the received print data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
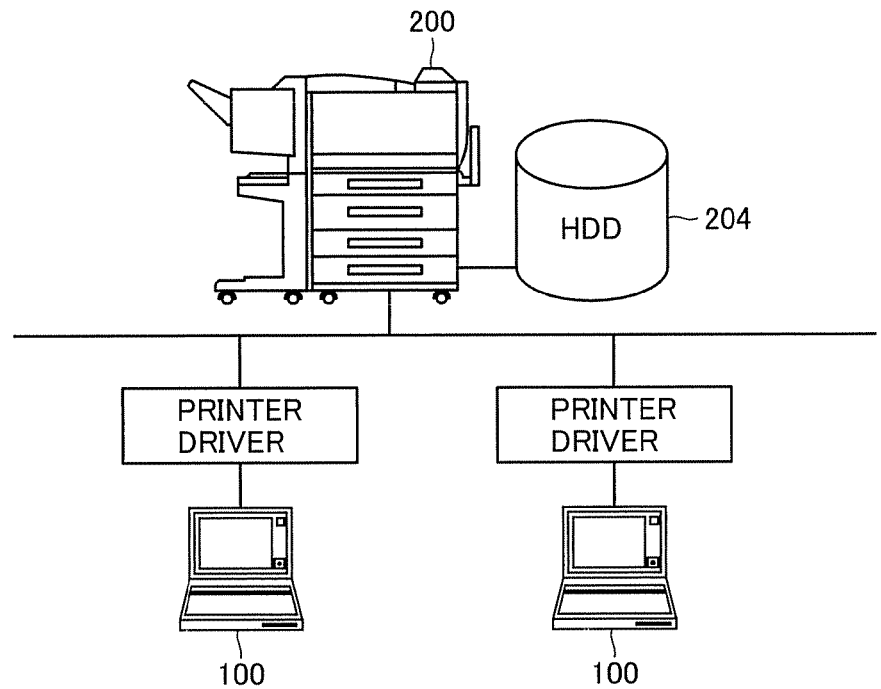
FIG. 1 schematically shows a configuration of an image forming system in a first embodiment of the present invention.

Embodiments of the present invention will be described in the following with reference to the drawings. In the drawings, like components denoted by like reference characters have the same ability and function unless otherwise noted, and a detailed description thereof will not be repeated.

First Embodiment

An image forming system in a first embodiment of the present invention will be described first.

Referring to FIG. 1, the image forming system includes a PC 100 that is an example of the information terminal and an MFP 200 that is an example of the image forming apparatus. PC 100 and MFP 200 are connected via a network and data for printing a file can be transmitted for example from PC 100 to MFP 200.

As shown in FIG. 1, while a plurality of information terminals and a single image forming apparatus are connected in the present embodiment, the number of terminals and apparatuses is not limited to the one as shown in FIG. 1. At least one information terminal and at least one image forming apparatus may be connected.

Next, a hardware configuration of PC 100 will be described.

Figure 2:
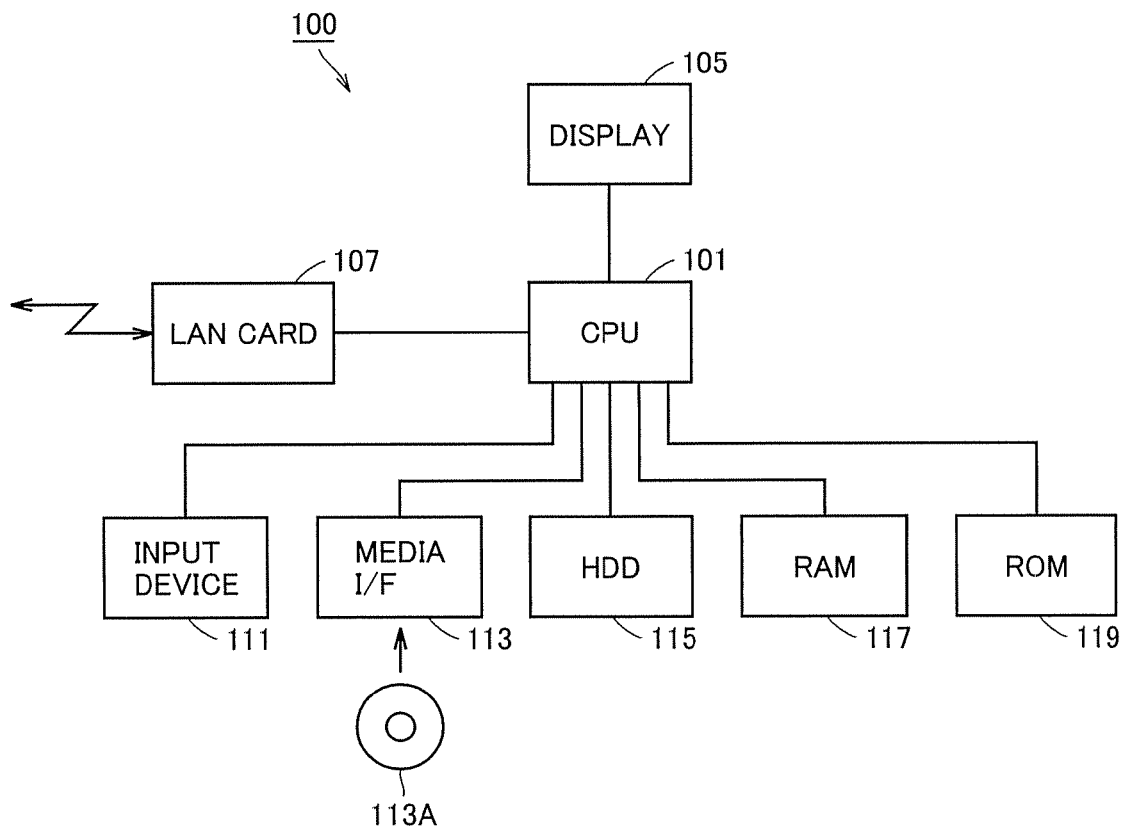
FIG. 2 schematically shows a hardware configuration of a PC (Personal Computer) in FIG. 1.

Referring to FIG. 2, PC 100 is configured using a common computer device including a CPU 101, a display 105, a LAN (Local Area Network) card 107, an input device 111, a media I/F (interface) 113, an HDD (Hard Disk Drive) 115, a RAM (Random Access Memory) 117, and a ROM (Read Only Memory) 119.

CPU 101 controls overall operation of PC 100. RAM 117 is used as a temporary data storage when CPU 101 performs various operations. ROM 119 stores various data such as a program executed by CPU 101. HDD 115 stores various information and data. LAN card 107 is used for communication via the network with other devices such as MFP 200. Media I/F drive 113 is used for reading and writing information by CPU 101 from and to a recording medium 113A detachable from PC 101 such as CD-ROM (Compact Disc Read Only Memory). Thus, CPU 101 can also perform a program recorded on recording medium 113A. Input device 111 is configured using keyboard, mouse and the like.

A hardware configuration of MFP 200 will then be described.

Figure 3:
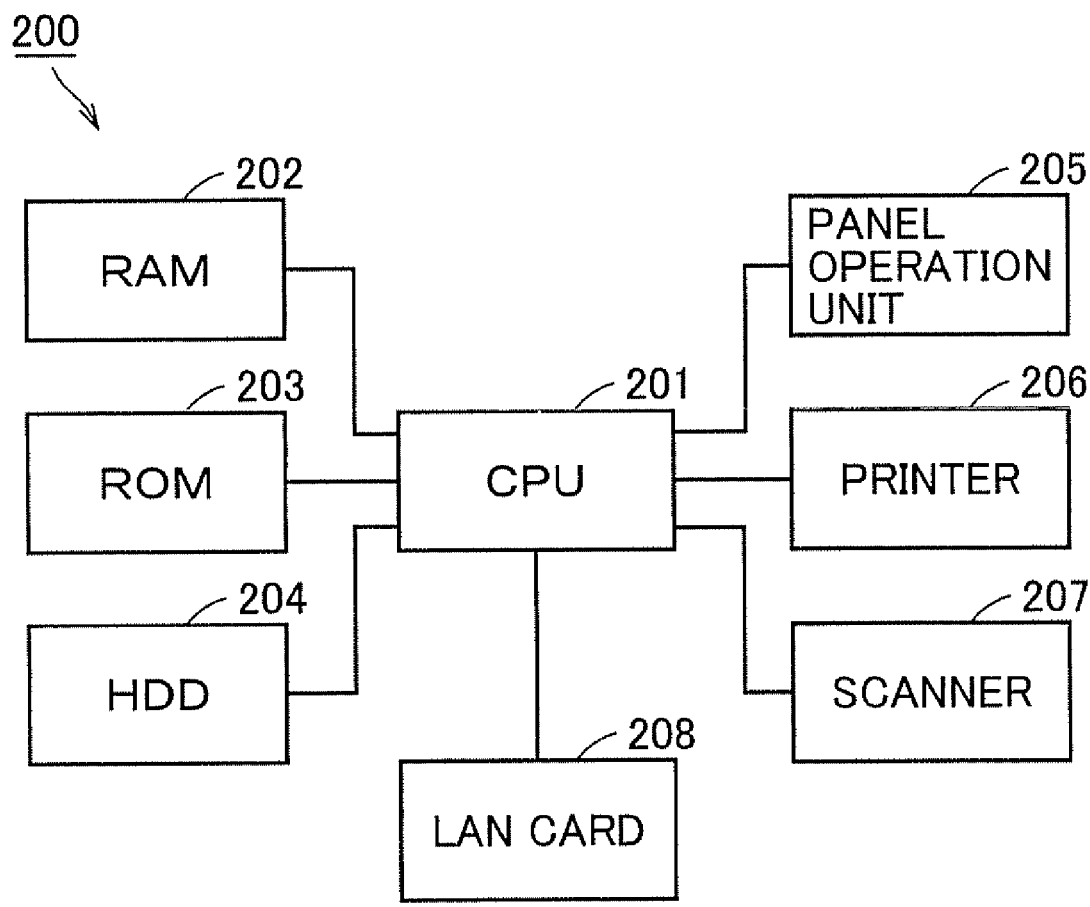
FIG. 3 schematically shows a hardware configuration of an MFP (Multi Function Peripheral) in FIG. 1.

Referring to FIG. 3, MFP 200 includes a CPU 201 controlling the whole apparatus, a RAM 202 temporarily storing data, a ROM 203 storing a program executed by CPU 201 and a constant for example, an HDD 204 for storing image data for example, a panel operation unit 205 having a single or a plurality of buttons and accepting operation for entering information by a user, a printer 206 performing printing (image forming operation) on a sheet of paper based on image data, a scanner 207 reading an image of an original placed on a platen (not shown), and a LAN card 208 for communication with other devices such as PC 100 via the network.

Respective configurations of MFP 200 and PC 100 will be described in detail.

Figure 4:
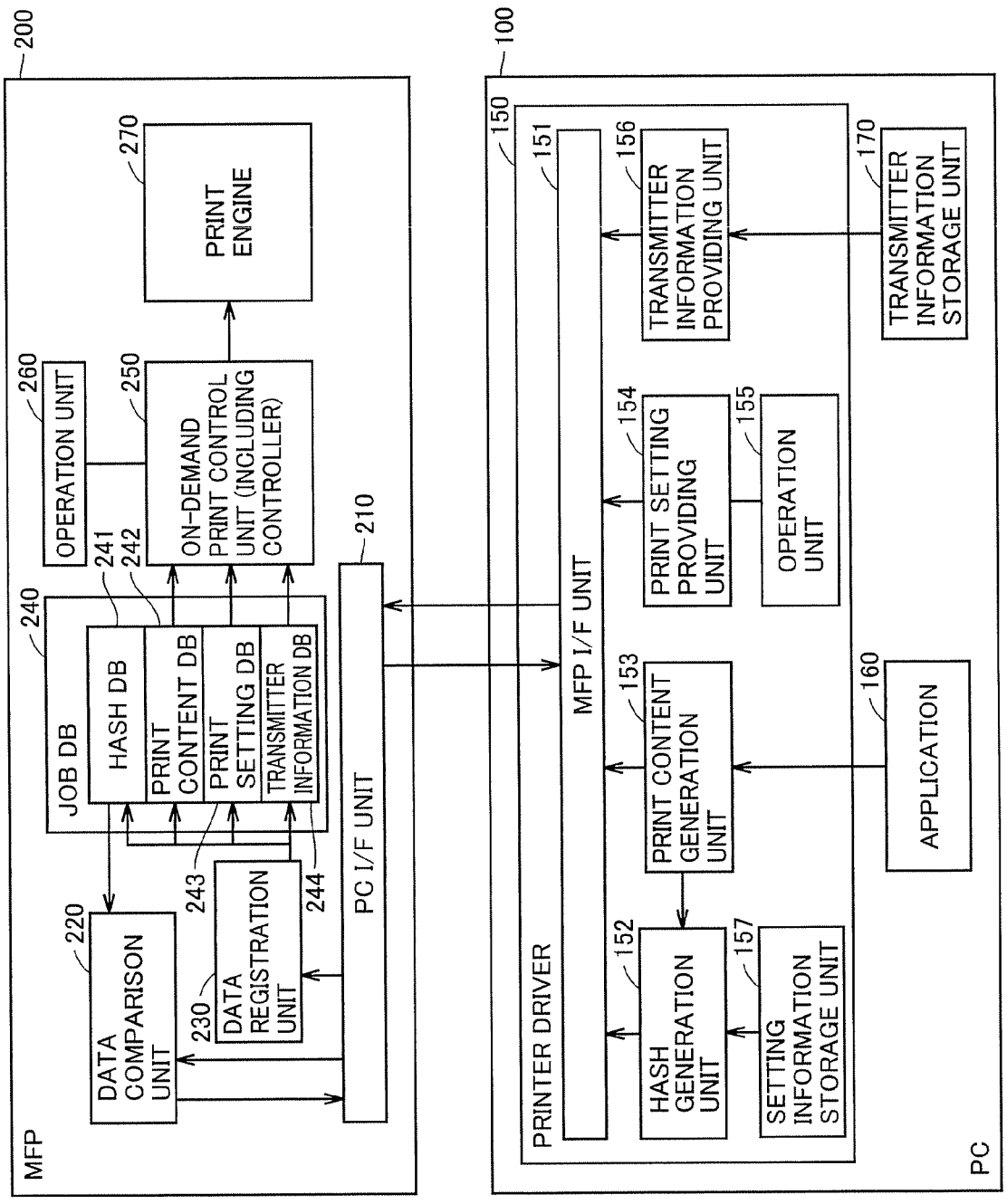
FIG. 4 is a control block diagram of the MFP and the PC in FIG. 1.

Referring to FIG. 4, PC 100 includes an application 160, a printer driver 150 generating print data for a file of application 160 and a transmitter information storage unit 170 storing information for identifying a user of PC 100.

Printer driver 150 includes an operation unit 155 accepting information entered by a user via input device 111, a print setting providing unit 154 generating information about print setting based on the information accepted by operation unit 155, a transmitter information providing unit 156 generating transmitter information based on the information stored in transmitter information storage unit 170, a print content generation unit 153 generating print content data based on a file generated by application 160, a hash generation unit 152 generating a hash value of the print content data generated by print content generation unit 153, a set information storage unit 157 storing information showing whether to make a determination about a hash value prior to transmission of the print data to MFP 200, and an MFP interface (I/F) unit 151 for transmitting and receiving information to and from MFP 200.

In the present embodiment, the hash value of the print content data corresponds to the hash value of the file from which the print content data is obtained.

In PC 100, in response to input of a print request for a file that is generated by application 160, printer driver 150 generates print data for the file and transmits the data to MFP 200. MFP 200 receiving the print data stores the print data in a job database (DB) 240 and, in response to operation performed on operation unit 260 for outputting the stored print data, performs printing (image forming operation) on the print data.

Here, the print data includes print content data generated by print content generation unit 153, print setting information (such as the number of prints to be made) generated by print setting providing unit 154, and transmitter information generated by transmitter information providing unit 156. Based on the user information about the user of PC 100 stored in transmitter information storage unit 170 (such as the account name used for logging in the network), transmitter information providing unit 156 generates transmitter information.

The print content data is for example data based on a file generated by application 160 and is data written in a PDL (Page Description Language). If the PDL data is generated by MFP 200, namely if a file to be printed is transmitted from PC 100 to MFP 200, print content DB 242 may directly store the file to be printed, instead of the print content data.

When a request to print a predetermined file is given to PC 100, printer driver 150 generates print content data by print content generation unit 153, generates print setting information by print setting providing unit 154, generates transmitter information by transmitter information providing unit 156 and generates a hash value of the print content data. Hash values stored by MFP 200 are read and the read hash values are compared with the hash value generated by hash generation unit 152. It is then determined whether or not any of the hash values read from MFP 200 is identical to the hash value generated by hash generation unit 152. When it is determined that any hash value is the same as the hash value generated by hash generation unit 152, the print data and the hash value are discarded.

MFP 200 includes a PC I/F unit 210 for transmitting and receiving data to and from PC 100, a data comparison unit 220 comparing a hash value transmitted from PC 100 with a hash value stored in a hash database (hash DB) 241 described hereinlater, job database (job DB) 240 storing data about a job to be executed and a job having been executed in MFP 200, operation unit 260 accepting various operations such as instruction to print the print data stored in job DB 240, an on-demand print control unit 250 allowing a print engine 270 to perform printing on the print data stored in job DB 240 based on information entered to operation unit 260, and a data registration unit 230 performing operation of storing the data (print data for example) that is input from PC 100 to PC I/F unit 210 in job DB 240. Operation unit 260 is configured with panel operation unit 205 and the print engine is configured with printer 206.

Job DB 240 includes hash DB 241, a print content database (print content DB) 242, a print setting database (print setting DB) 243, and a transmitter information database (transmitter information DB) 244. Print content DB 242, print setting DB 243 and transmitter information DB 244 store print content data, print setting information and transmitter information respectively that are transmitted from PC 100. Hash DB 241 stores the hash value of each print content stored in print content DB. A manner of storing information in job DB 240 is schematically shown in Table 1.

TABLE 1

Job DB

| Print Content | Hash Value | Stored User | Job Ticket 1 Print Setting | Job Ticket 2 Print Allowed User | Print Setting |
|---|---|---|---|---|---|
| propsal.doc | i4p0dU | Yamada | color, 2up | — | — |
| expense.xls | kagyu3 | Yamada | mono, 1up | — | — |
| shedule.xls | lkaw38 | Yamada | color, 2up | — | — |
| diary.doc | 7i38yq | Yamada | mono, 1up | — | — |
| contract.doc | n1rlmx | Yamada | color, 2up | — | — |

As understood from Table 1, job DB 240 stores, for each job (for each file to be printed), "Print Content" (print content data), "Hash Value," "Stored User" (transmitter information), and "Print Setting" (print setting information).

The print setting information (Print Setting in Table 1) stored in print setting DB 243 is data written in a PJL (Printer Job Language). Specifically, the print setting information stored in print setting DB 243 is generated by written in the PJL by print setting providing unit 154 and includes the details written in each box for the print setting in Table 1.

Table 1 shows the stored pieces of information for each job that are indicated side by side in a transverse line. For example, regarding the job indicated in the third transverse line from the top in Table 1, the PDL file for the file "shedule.xls", the hash value (1kaw38) for the PDL file, the transmitter information ("Yamada") about the user transmitting the job to MFP 200, and the print setting information (setting to print two copies (2up) in color) are correlated with each other and stored in this state.

Pieces of information generated by PC 100 are classified by data registration unit 230 and appropriately stored in job DB 240. Specifically, PC 100 generates the information as shown in Table 2 (such as print content, hash value, stored user and print setting information) each time a request to print a file is given. When predetermined conditions as described below are satisfied, the information is transmitted to MFP 200. In MFP 200, data registration unit 230 appropriately classifies the pieces of information transmitted from PC 100 and the pieces of information are stored as shown in Table 1 in hash DB 241, print content DB 242, print setting DB 243 and transmitter information DB244 of job DB 240.

TABLE 2

| | | Job Ticket | |
|---|---|---|---|
| Print Content | Hash Value | Stored User | Print Setting |
| shedule.xls | lkaw38 | Yoshida | color, 1up |

Printer driver 150 is implemented by performing by CPU 101 a predetermined program installed on HDD 115. The program may be downloaded via LAN card 107 from the network or the program recorded on recording medium 113A may be installed via media I/F 113.

In the image forming system in the present embodiment, in response to a print request to print a file as given to PC 100, printer driver 150 generates a hash value for the file to be printed and, prior to transmission of the above-described print data to MFP 200, determines whether or not any of hash values stored in hash DB 241 of MFP 200 is identical to the generated hash value. In MFP 200, respective hash values for files printed by MFP 200 or files to be printed by MFP 200 are stored. When PC 100 determines that any of the hash values stored in MFP 200 is identical to the hash value as generated at this time, PC 100 does not transmit to MFP 200 the print data generated for the file associated with the hash value and discards the print data.

The determination as described above may be made in the following manner. Printer driver 150 may transmit the generated hash value to data comparison unit 220 to compare the hash value with hash values stored in hash DB 241 by data comparison unit 220, and request an answer about whether the same hash value is stored to determine whether or not any of the stored hash values is identical to the generated hash value.

Figure 5:
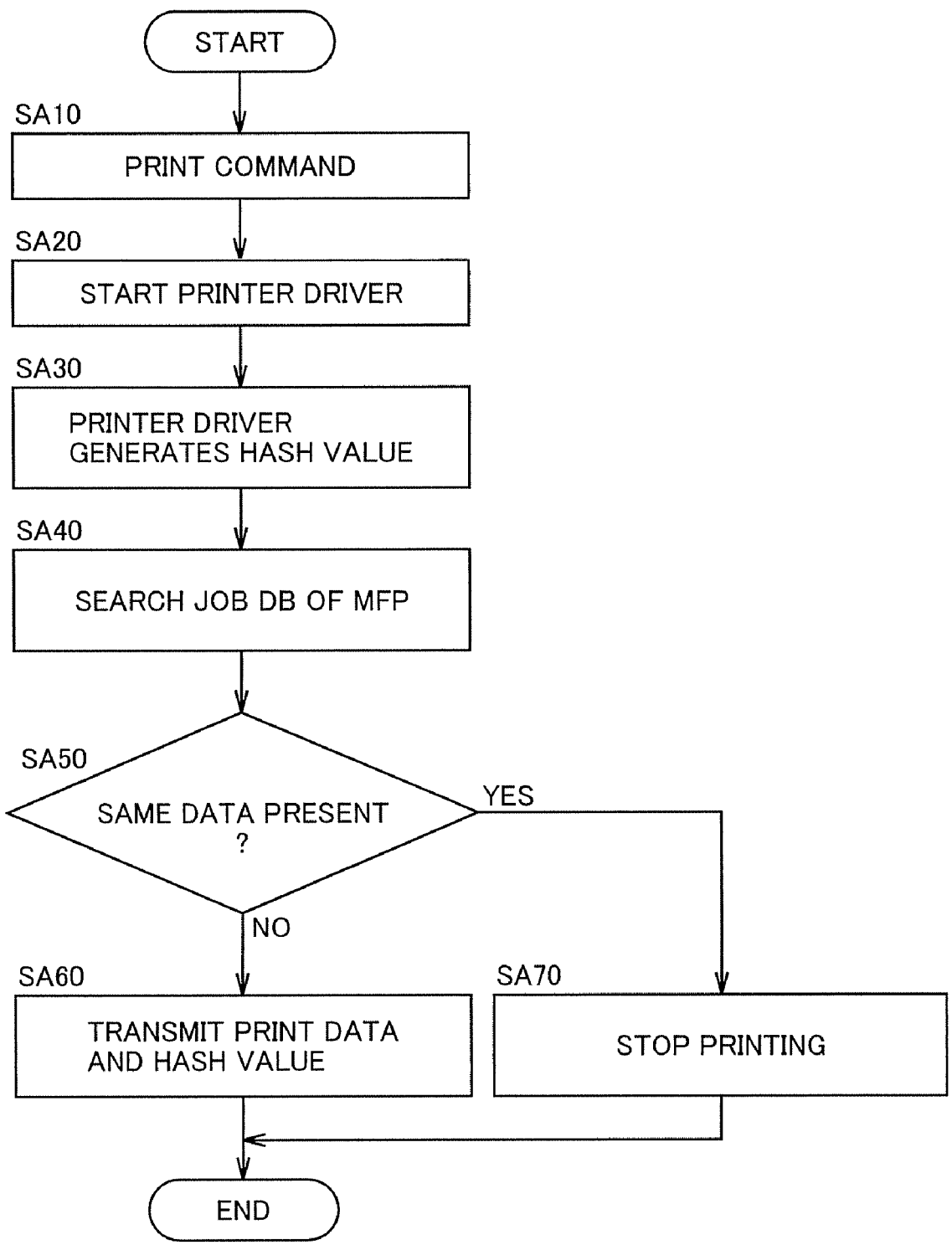
FIG. 5 is a flowchart of a process performed by a CPU (Central Processing Unit) in FIG. 2 in response to a print request to the PC.

A process performed by CPU 101 of PC 100 in response to a print request given to PC 100 will be described with reference to FIG. 5 showing a flowchart for the process. In the present embodiment, a request given from PC 100 to MFP 200 to register a print job is referred to as print request. An instruction to perform the registered print job that is given to MFP 200 (based on transmission of print data from PC 100) is referred to as print instruction.

Information about a print request is input via input device 111 to PC 100, and then application 160 generates a print command. Then, CPU 101 receives the print command from application 160 in step SA10 and proceeds to step SA20.

In step SA20, CPU 101 starts printer driver 150 and proceeds to SA30. After this, respective operations from step SA30 to step SA70 are performed by printer driver 150.

In step SA30, CPU 101 uses hash generation unit 152 to generate a hash value of a file for which the print request is given that is received via application 160 and proceeds to step SA40.

In step SA40, CPU 101 searches for a hash value stored in hash DB 241 of MFP 200 that is identical to the hash value generated by hash generation unit 152, and proceeds to step SA50.

In step SA50, CPU 101 having searched for the hash value determines whether or not hash DB 241 includes the same data as the hash value generated by hash generation unit 152 in step SA30 and, when it determines that there is the same data, CPU 101 proceeds to step SA70. When it determines that there is no identical data, CPU 101 proceeds to step SA60.

In step SA60, CPU 101 transmits to MFP 200 the print data (print content, print setting information and transmitter information) as well as the hash value and ends the process.

In contrast, in SA70, CPU 201 stops the process for the print request and ends the process. To stop the process for the print request includes, for example, deletion of the print content (PDL data) generated by print content generation unit 153 upon receiving a file for which the print request is given and which is sent from application 160, the print setting information generated by print setting providing unit 154 and the transmitter information generated by transmitter information providing unit 156. When the process is stopped, a message indicating that data such as print content associated with the print request is not sent to MFP 200 may be displayed on display 105.

Figure 6:
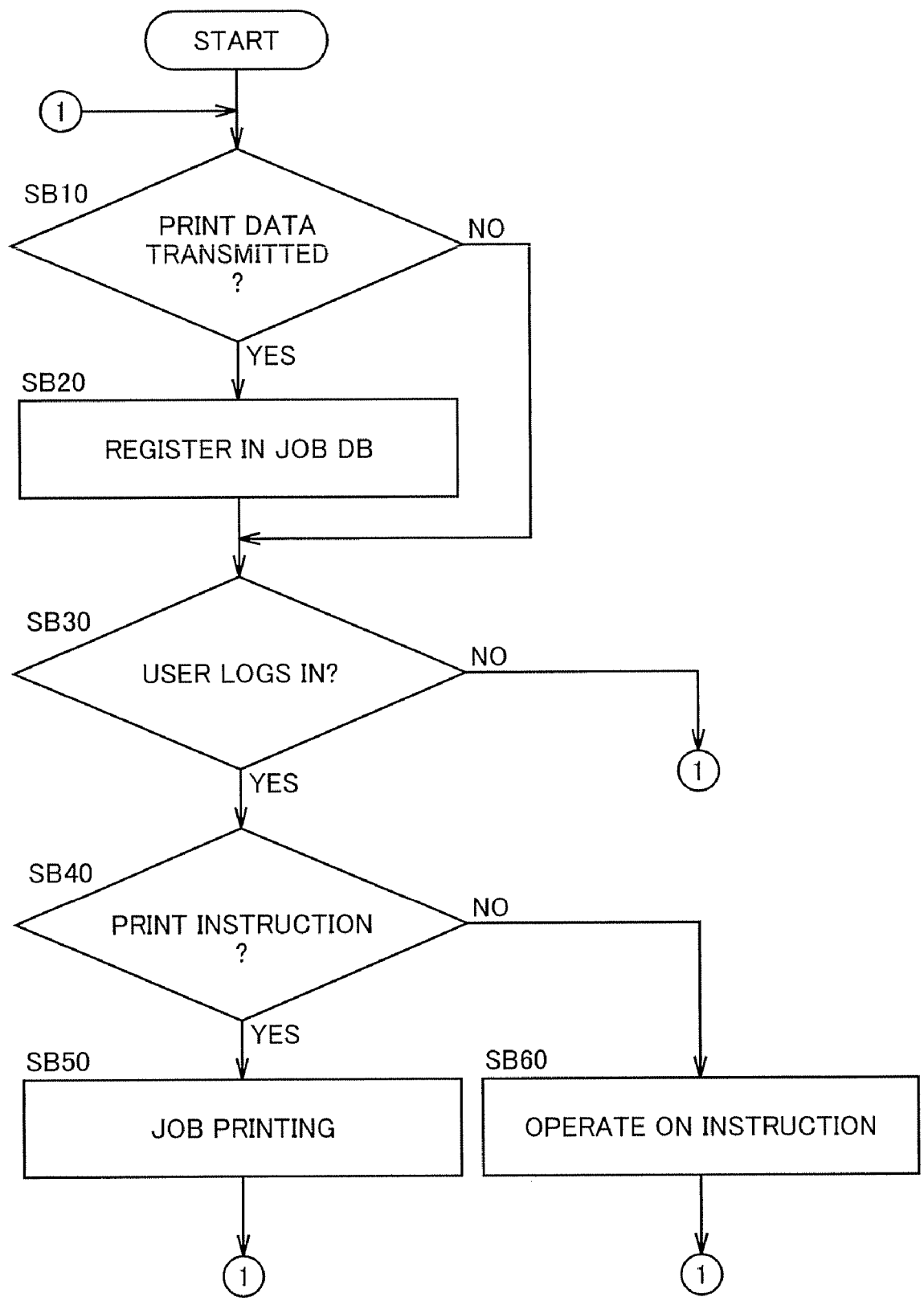
FIG. 6 is a flowchart of a process performed by a CPU in FIG. 3 in response to transmission of print data from the PC and a print instruction to the MFP.

Next, a description will be given of a process performed by CPU 201 of MFP 200 in response to transmission of print data from PC 100 and the above-described print instruction, with reference to FIG. 6 showing a flowchart of the process.

Referring to FIG. 6, CPU 201 determines whether or not print data is transmitted from PC 100 in step SB 10 and, when CPU 201 determines that print data is transmitted, CPU 201 proceeds to step SB20. When CPU 201 determines that print data is not transmitted, CPU 201 proceeds to step SB30.

In step SB20, CPU 201 appropriately classifies and registers the received print data in job DB 240 as described above and proceeds to step SB30. In step SB20, specifically the print data that is input via PC I/F unit 210 is classified into print content, print setting and transmitter information by data registration unit 230 and registered in print content DB 242, print setting DB 243 and transmitter information DB 244 respectively. In the case where a hash value associated with the print data is received, data registration unit 230 further registers the hash value in hash DB 241.

In step SB30, CPU 201 determines whether or not operation for logging in is done by a user via panel operation unit 205 for example. When CPU 201 determines that the operation is done, it proceeds to step SB40. Otherwise, it returns to step SB10.

In step SB40, CPU 201 determines whether or not panel operation unit 205 is operated for giving a print instruction for a job registered in job DB 240. When CPU 201 determines that the panel operation unit is operated in the above-described manner, CPU 201 proceeds to step SB50. When CPU 201 determines that the panel operation unit is operated in a different manner, CPU 210 proceeds to step SB60.

In step SB60, CPU 201 operates according to the operation performed on panel operation unit 205 and returns to step SB10.

In step SB50, CPU 201 performs print operation for the job based on the print instruction accepted in step SB40 and returns to step SB10

In the above-described embodiment, in the image forming system, in response to a print request of PC 100, print data for the print request is registered, together with a hash value of a file for which the print request is made, in job DB 240 of MFP 200. When operation is performed to give a print instruction to MFP 200 for a job registered in job DB240, MFP 200 performs printing of the job. Prior to transmission of the print data from PC 100 to MFP 200, PC 100 determines whether or not the hash value of the file for which the print request is given has already been registered in job DB 240. When it is determined that the hash value has been registered, PC 100 does not transmit the print data for the file to MFP 200. Namely, when a print request is given to PC 100, PC 100 transmits print data for the print request to MFP 200 under the condition that the hash value of the file for which the print request is made is not registered in job DB 240 of MFP 200.

In the present embodiment, job DB 240 registers, for each print job, the print content, hash value, print setting information and transmitter information until printing is performed according to the print instruction. Whether to transmit print data from PC 100 to MFP 200 is determined by comparing only the hash value of the file to be printed. Therefore, the present invention would be applicable to a system other than the system such as the image forming system in the present embodiment in which MFP 200 stores in advance print data as transmitted from PC 100 and then performs printing according to a print instruction to MFP 200, namely the system performing on-demand printing. In other words, the present invention would also be applicable to the image forming system in which MFP 200 performs a print job for print data in response to transmission of the print data from PC 100. In this case, however, while the hash value and the print data are registered in job DB 240 until the print job is performed, the data other than the hash value, namely the print data (print content, print setting information and transmitter information) may be erased at the time the print job is completed (or after a predetermined period (three days for example) has passed since the completion of the print job).

In the present embodiment, print data based on a file generated by scanner 207 may be additionally registered in job DB 240. In this case, in MFP 200, a component (not shown in FIG. 4) provided in MFP 200 generates the hash value of the print content of the print data and the hash value is registered in hash DB 241 (similarly for the hash value transmitted from PC 100).

Second Embodiment

In the image forming system of the first embodiment, PC 100 is configured to generate, in response to a print request, a hash value of a file for which the print request is given, determine whether or not the hash value has already been registered in job DB 240 of MFP 200, and not to transmit print data for the file to MFP 200 if the hash value has already been registered in job DB 240 of MFP 200.

In the image forming system of the present embodiment, based on information set in advance for PC 100 (printer driver 150), PC 100 determines whether to transmit the print data under the condition that the hash value is not registered in job DB 240.

The image forming system in the present embodiment includes, like the image forming system in the first embodiment, PC 100 and MFP 200 connected to PC 100 via a network. It is supposed that PC 100 and MFP 200 in the present embodiment have respective hardware configurations similar to those of the first embodiment. Therefore, the description of the similar configurations will not be repeated here.

In PC 100, the above-described information based on which whether to transmit the print data under the above-described condition is determined is stored in setting information storage unit 157. Specifically, setting information storage unit 157 stores information about whether setting is ON or OFF (setting for determination is ON or OFF), namely whether to make the determination based on the hash value.

Figure 7:
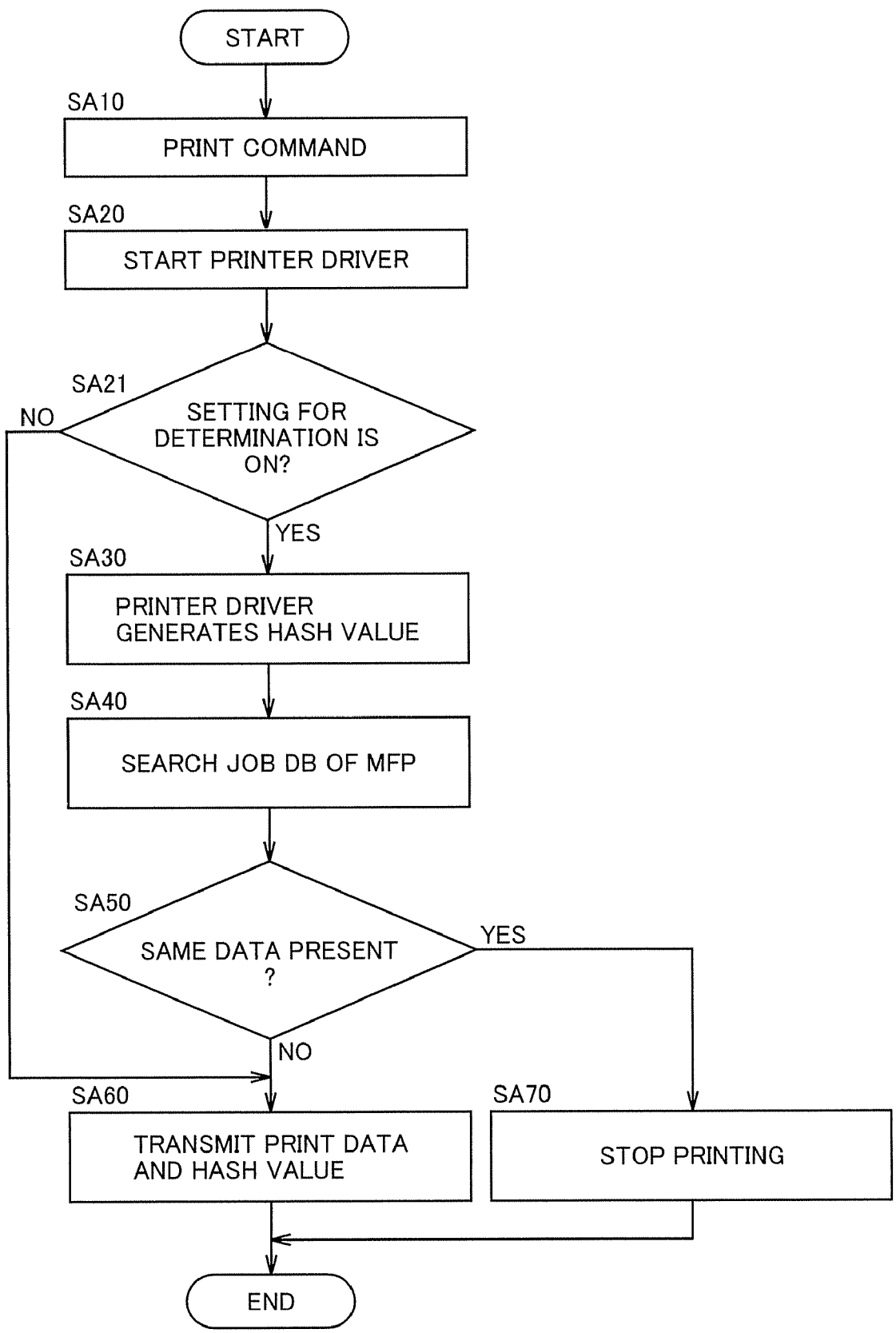
FIG. 7 is a flowchart of a process performed by a CPU of a PC in a second embodiment of the image forming system of the present invention, in response to a print request to the PC.

FIG. 7 is a flowchart of a process performed by CPU 101 of PC 100 in response to a print request given to PC 100 in the present embodiment.

Referring to FIG. 7, in the present embodiment, CPU 101 starts printer driver 150 in step SA20 and thereafter determines whether the information stored in setting information storage unit 157 is ON or OFF. When CPU 101 determines that the information is ON, CPU 101 proceeds to step SA30 or proceeds to step SA60 when it determines that the information is OFF.

In the present embodiment as described above, when the information stored in setting information storage unit 157 is ON, PC 100 transmits print data for a file to MFP 200 under the condition that the hash value of the file for which the print request is given has not been registered in job DB 240 of MFP 200. In contrast, when the information stored in setting information storage unit 157 is OFF, PC 100 transmits the print data and the hash value to MFP 200 in step SA60 regardless of whether the hash value of the file for which the print request is given has already been stored in job DB 240.

Thus, in the case for example where it is apparent that a file to be printed has not been printed by MFP 200, PC 100 can immediately address the print request since such operations as generation and comparison of the hash value are skipped.

Whether to store the ON or OFF in setting information storage unit 157 can appropriately be changed by operation of input device 111 by a user for example.

Third Embodiment

In the image forming system of the first embodiment, PC 100 is configured to generate, in response to a print request, a hash value of a file for which the print request is given, determine whether or not the hash value has already been registered in job DB 240 of MFP 200, and not to transmit print data for the file to MFP 200 if the hash value has already been registered in job DB 240 of MFP 200.

In the image forming system of the present embodiment, based on whether or not a file to be printed has at least a data size which is set in advance for PC 100 (printer driver 150) (hereinafter the data size is referred to as "A" for convenience), PC 100 determines whether to transmit the print data under the condition that the hash value is not registered in job DB 240.

The image forming system in the present embodiment includes, like the image forming system in the first embodiment, PC 100 and MFP 200 connected to PC 100 via a network. PC 100 and MFP 200 have respective hardware configurations similar to those of the first embodiment. Therefore, the description of the similar configurations will not be repeated here.

PC 100 stores information identifying the above-described data size in setting information storage unit 157.

Figure 8:
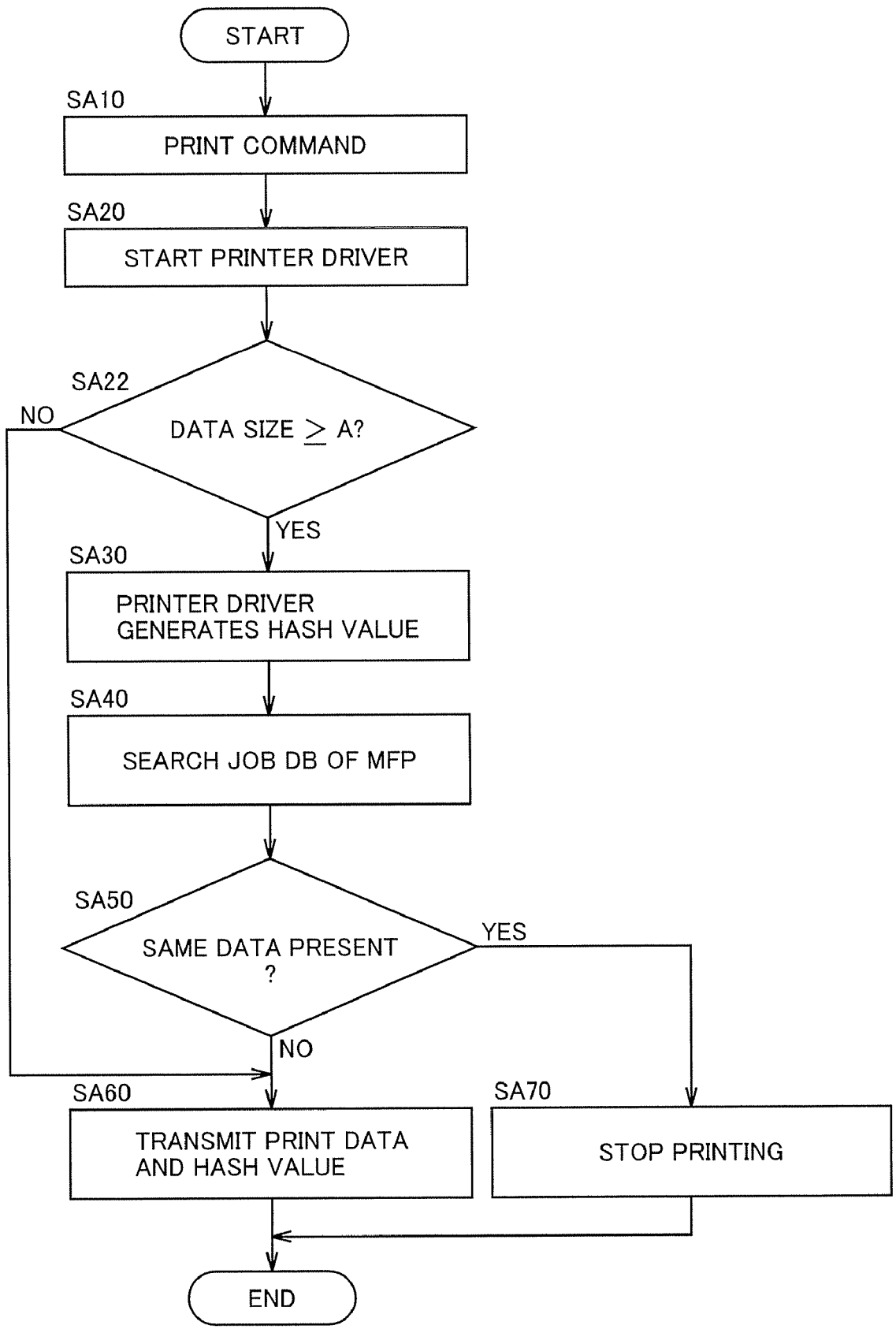
FIG. 8 is a flowchart of a process performed by a CPU of a PC in a third embodiment of the image forming system of the present invention, in response to a print request to the PC.

FIG. 8 is a flowchart of a process performed by CPU 101 of PC 100 in response to a print request given to PC 100 in the present embodiment.

Referring to FIG. 8, CPU 100 starts printer driver 150 in step SA20, thereafter determines whether or not the size of the file to be printed is not less than A in step SA22, and proceeds to step SA30 when it determines that the size is not less than A or to step SA60 when it determines that the size is less than A.

In the present embodiment as described above, in the case where the size of the file to be printed is not less than a predetermined data amount, print data for the file is transmitted to MFP 200 under the condition that the hash value of the file for which the print request is given has not been registered in job DB 240 of MFP 200. In contrast, in the case where the file size is less than the specific data amount, the print data and the hash value are transmitted to MFP 200 in step SA60 regardless of the fact that the hash value of the file for which the print request is given has already been registered in job DB 240.

Thus, in the case where a file to be printed has a small size and thus causes no significant problem even if the file is registered in duplicated manner on HDD 115 of MFP 200, operations such as generation and comparison of the hash value are skipped so that PC 100 can immediately address the print request.

The information identifying file size A stored in setting information storage unit 157 may appropriately be changed by operation of input device 111 by a user for example.

Fourth Embodiment

An image forming system in the present embodiment includes an MFP 400 and a PC 500. Respective hardware configurations of MFP 400 and PC 500 may be similar to those of MFP 200 and PC 100 in the embodiments described above. Therefore, the description of the similar hardware configurations will not be repeated here.

Figure 9:
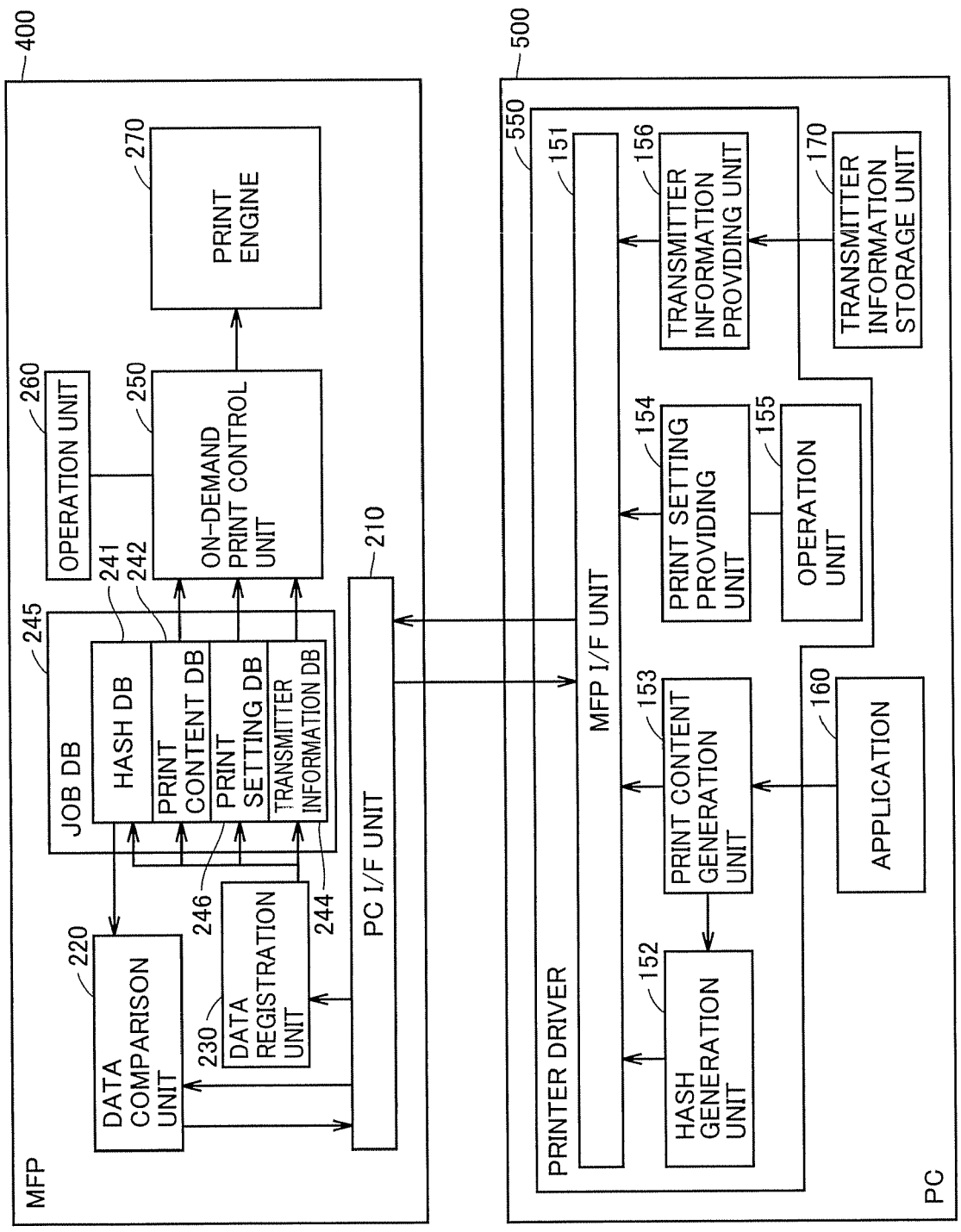
FIG. 9 is a control block diagram of an MFP and a PC in a fourth embodiment of the image forming system of the present invention.

FIG. 9 is a control block diagram of MFP 400 and PC 500 that are components of the image forming system in the present embodiment. In the following, respective configurations of PC 500 and MFP 400 will be described in detail.

Referring to FIG. 9, PC 500 includes an application 160, a printer driver 550 generating print data for a file of application 160 and a transmitter information storage unit 170 storing information for identifying a user of PC 500.

Printer driver 550 includes an operation unit 155 accepting information entered by a user via an input device 111, a print setting providing unit 154 generating information about print setting based on the information accepted by operation unit 155, a transmitter information providing unit 156 generating transmitter information based on information stored in a transmitter information storage unit 170, a print content generation unit 153 generating a print content based on a file generated by application 160, a hash generation unit 152 generating a hash value of the print content generated by print content generation unit 153 and an MTP interface (I/F) unit 151 for transmitting and receiving information to and from MFP 400.

In the present embodiment, the hash value of the print content corresponds to the hash value of the data of the file based on which the print content is generated.

In PC 500, in response to a print request for a file generated by application 160, printer driver 550 generates print data for the file and transmits the data to MFP 400. Receiving the print data, MFP 400 stores the print data in a job DB 245 and, in response to operation performed on operation unit 260 for outputting the print data as stored, MFP 400 performs printing (image forming) for the print data.

The print data includes the print content generated by print content generation unit 153, the print setting information (such as the number of prints to be made) generated by print setting providing unit 154 and the transmitter information generated by transmitter information providing unit 156. Transmitter information providing unit 156 generates the transmitter information based on the user information (such as the account name used when the user logs into the network) about the user of PC 500 as stored in transmitter information storage unit 170.

The print content is data based on the file generated by application 160 and is data written in a PDL. If MFP 400 generates the PDL data, namely if a file to be printed is transmitted from PC 500 to MFP 400, print content DB 242 may store the file as it is to be printed, instead of the print content.

In response to a print request for a predetermined file to PC 500, printer driver 550 generates print content by print content generation unit 153, generates print setting information by print setting providing unit 154, generates transmitter information by transmitter information providing unit 156, and generates a hash value of the print content. Hash values stored in MFP 400 are read and compared with the hash value generated by hash value generation unit 152. It is determined whether any of the hash values read from MFP 400 is the same as the hash value generated by hash generation unit 152. When it is determined that any of the hash values is identical to the generated hash value, the hash value and the print data are discarded.

Referring again to FIG. 9, MFP 400 includes a PC I/F unit 210 for transmitting and receiving data to and from PC 500, a data comparison unit 220 comparing a hash value transmitted from PC 500 with hash values stored in a hash database (hash DB) 241 described hereinlater, a job database (job DB) 240 storing a job to be performed and a job having been performed by MFP 400, an operation unit 260 accepting input of various operations such as a print instruction for print data stored in job DB 245, an on-demand print control unit 250 allowing a print engine 270 to perform printing on print data stored in job DB 245 based on the information entered to operation unit 260, and a data registration unit 230 storing data (print data for example) that is input form PC 500 to PC I/F unit 210 in job DB 245. Operation unit 260 is configured with a panel operation unit 205 and the print engine is configured with a printer 206.

Job DB 245 includes hash DB 241, a print content database 242, a print setting DB 246, and a transmitter information DB 244. Print content DB 242, print setting DB 246 and transmitter information DB 244 respectively store the print content, print setting information and transmitter information transmitted from PC 500. Hash DB 241 stores the hash value of each print content stored in the print content DB. The information is stored in job DB 245 in the manner as schematically shown in Table 3.

TABLE 3

| | | Job DB | | | | |
|---|---|---|---|---|---|---|
| | | Job Ticket 1 | | | Job Ticket 2 | |
| | | | | | Print | |
| Print Content | Hash Value | Stored User | Already Output | Print Setting | Allowed User | Already Output | Print Setting |
| propsal.doc | i4p0dU | Yamada | | color, 2up | — | | — |
| expense.xls | kagyu3 | Yamada | ∨ | mono, 1up | — | | — |
| shedule.xls | lkaw38 | Yamada | ∨ | color, 2up | Yoshida | | color, 1up |
| diary.doc | 7i38yq | Yamada | | mono, 1up | — | | — |
| contract.doc | n1rlmx | Yamada | | color, 2up | — | | — |

As understood from Table 3, job DB 245 stores, for each job (for each file to be printed), "Print Content" (print content), "Hash Value", "Stored User" (transmitter information) and "Print Setting" (print setting information).

The print setting information ("Print Setting" in Table 3) stored in print setting DB 246 is data written in a PAL. Namely, the print setting information stored in print setting DB 246 includes details written in the PJL and generated by print setting providing unit 154 and indicated in each box of the print setting in Table 3.

In Table 3, for each job, pieces of information as stored are indicated side by side in a transverse line. For example, regarding the job indicated in the third transverse line from the top of Table 3, the PDL file for the file "schedule.xls", the hash value ("1 kaw38") of the PDL file, the transmitter information ("Yamada") about the user transmitting the job to MFP 400, and the print setting information (setting to make two prints (2up) in color) are correlated with each other and stored in this state.

Job DB 245 can store a plurality of print settings for each print content in the state where the print settings are correlated with each other. Specifically, in job DB 245, as shown in Table 3, for the job in the aforementioned third line, in association with the PDL file for the file "schedule.xls", the Stored User and Print Setting are stored as "Job Ticket 1" and information identifying the user who transmitted the print request for the print content of the job (Print Allowed User "Yoshida") and the print setting according to the print request by the user (setting to make a print (1up) in color) are stored as "Job Ticket 2".

In the present embodiment, when PC 500 accepts a print request for a certain file, PC 500 determines whether or not data for the file is stored in job DB 245 of MFP 400. The determination in this case is preferably made in the following manner. Specifically, in the case where hash DB 241 stores hash values of print contents based on files, a hash value of the PDL data for the certain file is generated and the generated hash value and the stored hash value are compared with each other. If MFP 400 stores a file generated by application 160 for example without being converted to PDL data for example, files may be compared with each other for making the determination.

In job DB 245, pieces of information generated by PC 500 are classified and appropriately stored by data registration 230. Namely, PC 500 generates the information as shown in Table 4 (print content, hash value, stored user and print setting information) each time a print request for a file is made, and transmits the information to MFP 400 in the case where a predetermined condition as described below is satisfied. In MFP 400, data registration unit 230 appropriately classifies the information transmitted from PC 500 to store the information in hash DB 241, print content DB 242, print setting DB 246 and transmitter information DB 244 of job DB 245 as shown in Table 3.

TABLE 4

| Print Content | Hash Value | Job Ticket | |
|---|---|---|---|
| | | Stored User | Print Setting |
| shedule.xls | lkaw38 | Yoshida | color, 1up |

When it is determined that a print content (or file) for which the print request is made by PC 500 has already been stored in print content DB 242 based on a comparison between hash values for example, PC 500 transmits to MFP 200 information identifying the file (or print content) in the state included in the print data instead of the print content. In this case, job DB 245 treats the transmitter information as "Print Allowed User" instead of "Stored User" as described above.

Printer driver 550 is implemented by execution by CPU 101 of a predetermined program installed on HDD 115 for example. The program may be downloaded from the network via LAN card 107 or the program recorded on recording medium 113A may be installed via media I/F 113.

In the image forming system of the present embodiment, in response to a print request for a file to PC 500, printer driver 550 generates a hash value of the file and determines, before transmitting the print data to MFP 400, whether or not any of the hash values stored in hash DB 241 of MFP 400 is identical to the generated hash value MFP 400 stores the hash value of a file having been printed or a file to be printed by MFP 400. When printer driver 550 determines that none of the hash values stored in MFP 400 is identical to the hash value generated at this time, printer driver 550 transmits the hash value and the print data (print content, print setting information and transmitter information) to MFP 400, or transmits to MFP 400 the print setting information, transmitter information and information identifying the file when printer driver 550 determines that the hash value identical to the generated hash value is stored in MFP 400.

The above-described determination may be made in the following manner. Specifically, printer driver 550 transmits the generated hash value to data comparison unit 220. Data comparison unit 220 compares the hash value with hash values stored in hash DB 241. Printer driver 550 requests the data comparison unit to give an answer about whether the same hash value is stored.

The determination may not necessarily be made based on the comparison of the hash values, and may be made by comparing files or print contents themselves.

Figure 10:
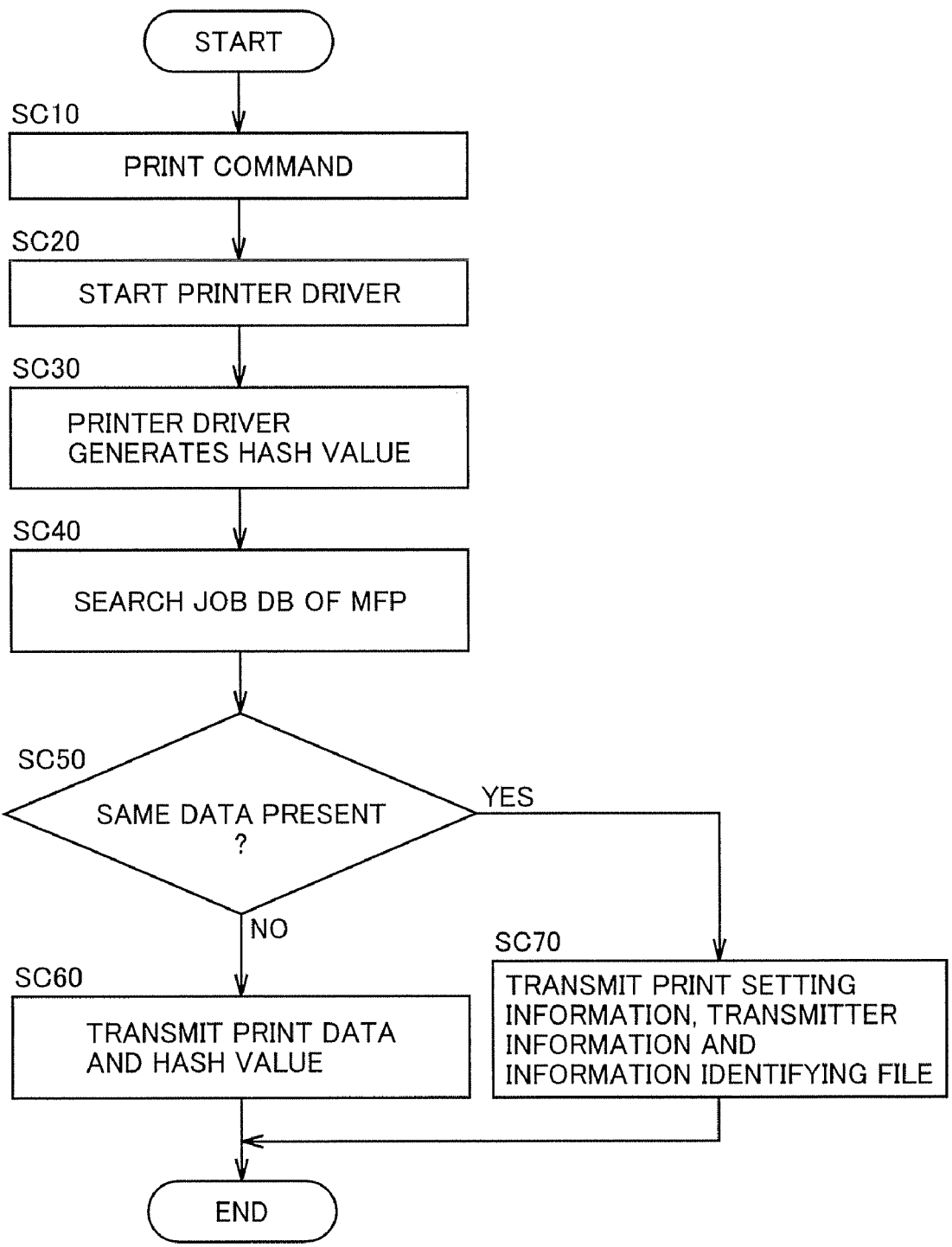
FIG. 10 is a flowchart of a process performed by a CPU of the PC in FIG. 9 in response to a print request to the PC.

A description will be given of a process performed by CPU 101 of PC 500 in response to a print request given to PC 500, with reference to FIG. 10 which is a flowchart of the process. In the present embodiment, a request to register a print job as given from PC 500 to MFP 400 is referred to as print request. An instruction to MFP 400 to perform the registered print job (based on transmission of print data from PC 500) is referred to as print instruction.

In response to input of information about a print request via input device 111 of PC 500, application 160 generates a print command and CPU 101 accepts the print command from application 160 in step SC10 and proceeds to step SC20.

In step SC20, CPU 101 starts printer driver 550 and proceeds to step SC30. After this, steps SC30 to SC70 are performed by printer driver 550.

Step SC30, CPU 101 allows hash generation unit 152 to generate a hash value of a file for which the print request is made as received via application 160, and proceeds to step SC40.

In step SC 40, CPU 101 searches for the same hash value stored in hash DB 241 of MFP 400 as the hash value generated by hash generation unit 152 and proceeds to step SC50.

In step SC50, CPU 101 determines whether or not hash DB 241 stores the same data as the hash value generated by hash generation unit 152 in step SC 30 based on the result of the search in step SC40, and proceeds to step SC70 upon determining that the same hash value is stored, or proceeds to step SC60 upon determining that the same hash value is not stored.

In step SC60, CPU 101 transmits to MFP 400 the print data (print content, print setting information and transmitter information) and the hash value and ends the process.

In contrast, in SC70, CPU 101 transmits to MFP 400 the information identifying the file for which the print request is made, print setting information and transmitter information and ends the process.

A description will be given of a process performed by CPU 201 of MFP 400 in response to transmission of print data for example from PC 500 and the print instruction as described above, with reference to FIG. 11 which is a flowchart of the process.

Figure 11:
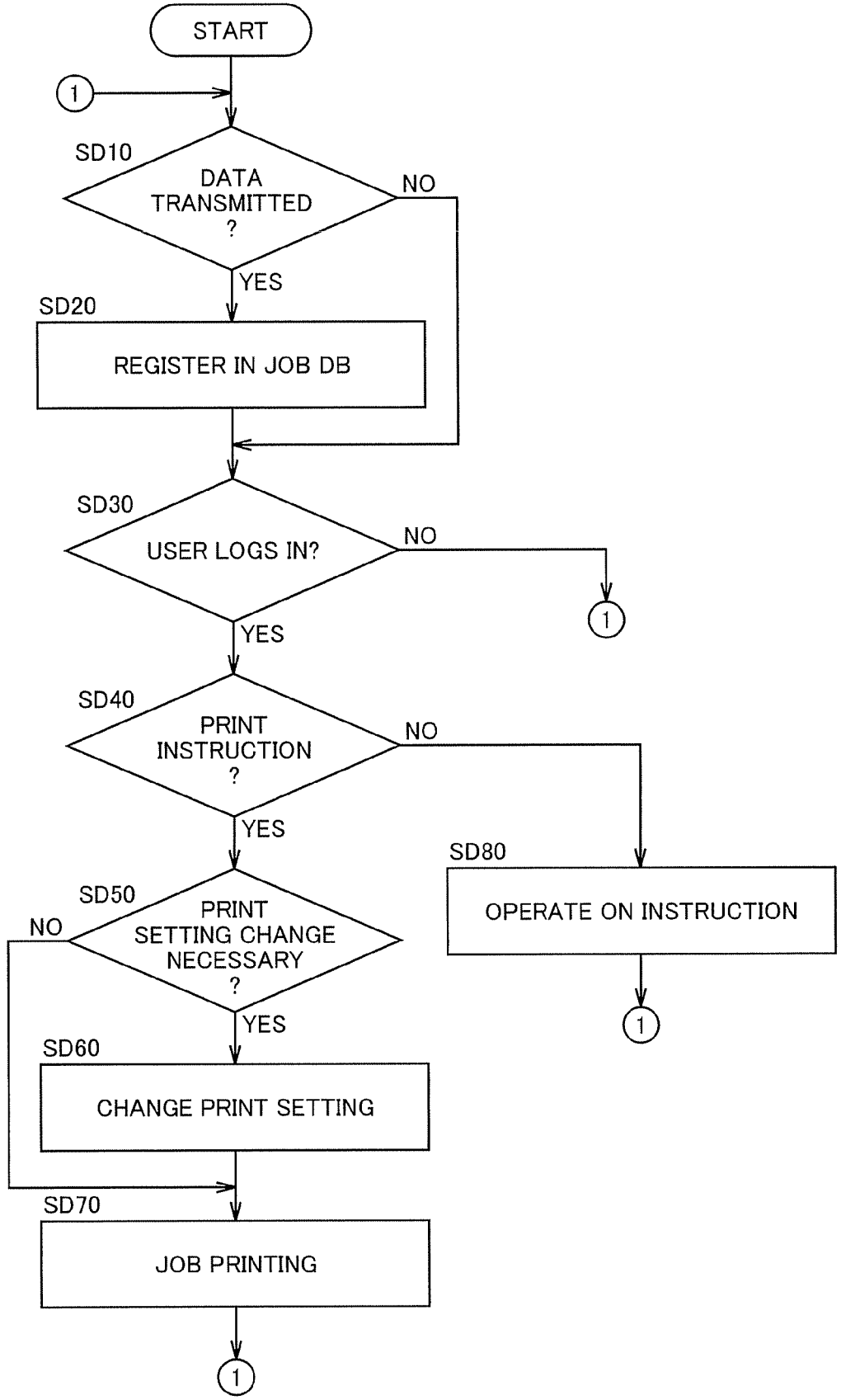
FIG. 11 is a flowchart of a process performed by a CPU of the MFP in FIG. 9 in response to transmission of print data from the PC and a print instruction to the MFP.

Referring to FIG. 11, CPU 201 determines in step SD10 whether or not data is transmitted from PC 500, and proceeds to step SD20 upon determining that the data is transmitted, or proceeds to step SD30 upon determining that the data is not transmitted.

In step SD20, CPU 201 classifies received data and registers them in job DB 245 as described above, and proceeds to step SD30. In step SD 20, specifically the print data input via PC I/F unit 210 are classified by data registration unit 230 into print content, print setting and transmitter information and they are registered respectively in print content DB 242, print setting DB 246 and transmitter information DB 244. In the case where the hash value for the print data is received, data registration unit 230 further registers the hash value in hash DB 241. In the case where information identifying the file is received instead of the print content, the print setting information received together with the information identifying the file is registered as shown as "Job Ticket 2" in Table 3.

In step SD30, CPU 201 determines whether or not operation is performed for log-in by a user via panel operation unit 205 for example, and proceeds to step SD40 upon determining that the operation is performed or returns to step SD10 upon determining that the operation is not performed. Here, the operation for log-in refers to input of information for identifying the user such as user ID.

In step SD40, CPU 201 determines whether or not panel operation unit 205 is operated for a print instruction of a job registered in job DB 245, and proceeds to step SD50 upon determining that the panel operation unit is operated for the print instruction, or proceeds to step SD80 upon determining that panel operation unit 205 is operated for another purpose.

In step SD80, CPU 201 performs operation appropriate for the operation performed on panel operation unit 205 and returns to step SD10.

In step SD50, CPU 201 determines, for the job (job to for which the print instruction is given in step SD40) to be processed currently, whether or not the print setting should be changed from the print setting information appropriate for Stored User to any, and proceeds to step SD60 upon determining that it should be changed, or proceeds to step SD70 upon determining that the change is unnecessary. The determination as to whether or not the change is necessary is made based on whether or not the print setting information associated with the Stored User and the print setting information associated with the log-in user (Stored User or Print Allowed User) in step SD30 are different in any respect.

In step SD60, CPU 201 transmits to print engine 270 the information that the print setting is changed and proceeds to step SD70.

In step SD70, printing is performed on the job based on the print instruction accepted in step SD40, and the process returns to step SD1.

In the present embodiment as described above, job DB 245 registers, for each print job, the print content, hash value, print setting information and transmitter information until print operation based on a print instruction is performed. Whether to transmit print data from PC 500 to MFP 400 is determined by comparison of only a hash value of a file to be printed. Therefore, the present invention would be applicable to a system other than the system such as the image forming system in the present embodiment in which MFP 400 stores in advance print data transmitted from PC 500 and performs print operation in response to a print instruction given to MFP 400, namely the system executing so-called on-demand printing. Namely, the present invention would be applicable as well to the image forming system in which MFP 400 performs a print job for print data in response to transmission of the print data from PC 500. In this case, the system may be configured in the following manner. While job DB 245 registers the hash value and print data until the print job is executed, the data other than the hash value, namely print data (print content, print setting information and transmitter information) is erased at the time the print job is completed (or after a predetermined period (three days for example) from the completion of the print job).

Job DB 245 stores, in association with each print setting information, information about whether or not the image forming operation associated with the print setting information is ended ("Already Output" in Table 3). In Table 3, the empty box in the "Already Output" column means that information showing that the image forming operation has not been performed is stored. The box in which a check mark is indicated means that information showing that the image forming operation has been performed is stored.

In the case where CPU 201 for example erases the print data as described above, preferably the print data is erased under the condition that all boxes in the "Already Output" columns for the print content of the print data are checked, namely under the condition that all boxes in the "Already Output" columns for the print setting information stored in job DB 245 in association with the print content are checked. In other words, preferably the print data is erased under the condition that the jobs for all relevant users are ended.

In the present embodiment, the print contents stored in job DB 245 are subjected to the image forming operation under the condition that operation for giving an output instruction again to MFP 400 is performed.

Figure 12:
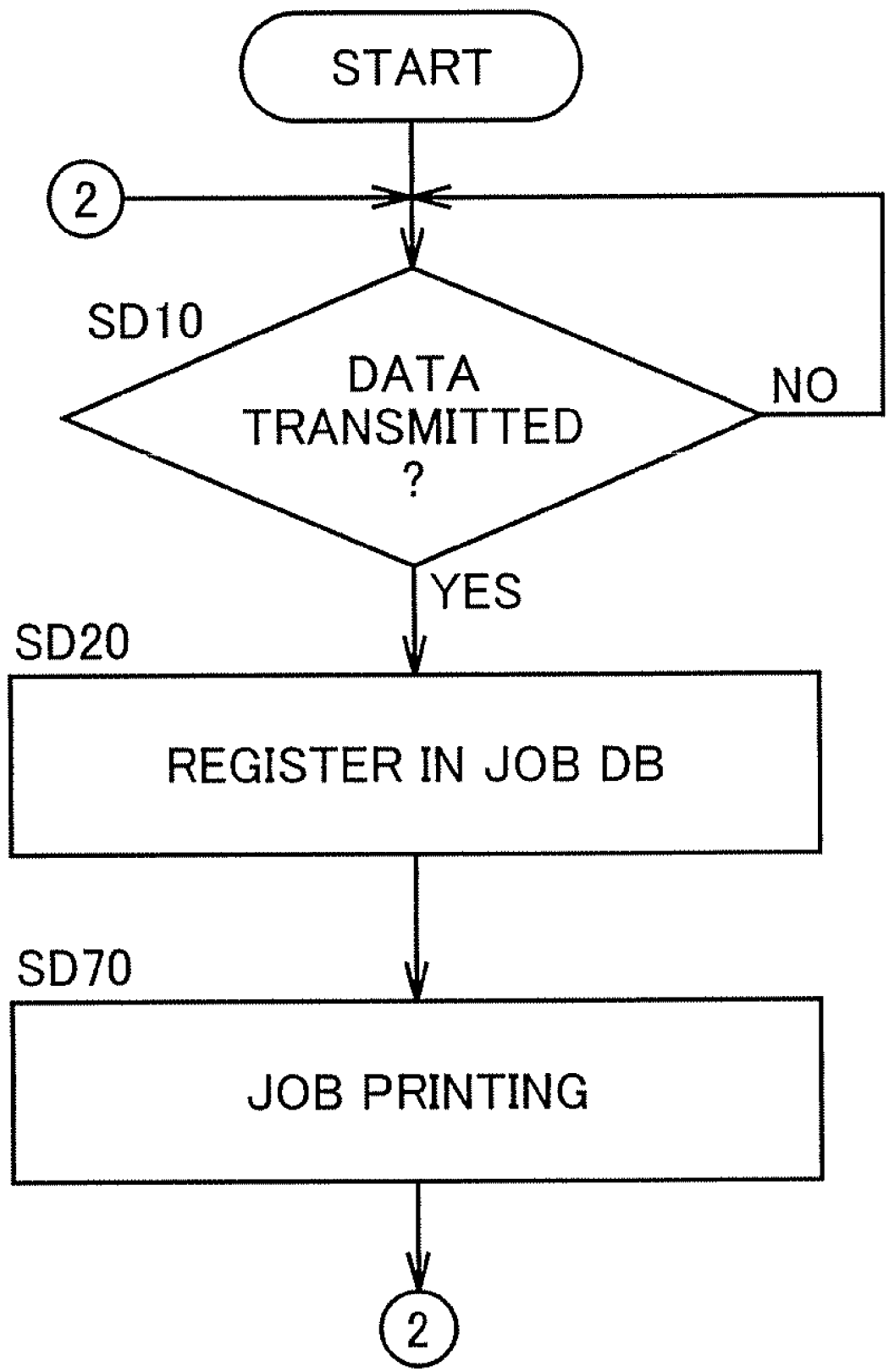
FIG. 12 is a flowchart of a process in a modification of FIG. 11.

Receiving data such as print content from PC 500, MFP 400 can perform printing without the need for user log-in for example. Specifically, when CPU 201 of MFP 400 determines that data is transmitted from PC 500 in step SD10 as shown in FIG. 12, CPU 201 proceeds to step SD20. In step SD20, the received data are appropriately classified and registered in job DB 245 and the process proceeds to step SD70.

In step SD70, CPU 201 performs printing (image forming operation) based on the received data and ends the process. In the case where the information identifying the file, print setting and transmitter information are received, CPU 201 reads the print content associated with the information identifying the received file from job DB 245 and, according to the received print setting, allows print engine 270 to perform image forming operation for the read print content.

Alternative Embodiment

An information terminal (PC 100, 500) includes an acceptance unit (LAN card 107 and/or input device 111) accepting a print request for a specific file, a setting information generation unit (CPU 101) generating setting information about printing of the specific file, a determination unit (CPU 101) determining whether or not data stored in a data storage unit include data for the specific file, and a transmission unit (CPU 101, LAN card 107) transmitting the data to an image forming apparatus.

In the case where the determination unit determines that the data for the specific file is stored in the data storage unit, the transmission unit transmits information identifying the specific file and the setting information generated by the setting information generation unit to the image forming apparatus. In the case where the determination unit determines that the data for the specific file is not stored in the data storage unit, the transmission unit transmits the data for the specific file and the setting information generated by the setting information generation unit to the image forming apparatus.

The image forming apparatus (MFP 200, MFP 400) includes a reception unit (LAN card 208) receiving data transmitted from the information terminal, an image forming unit (printer 206) performing image forming operation, and a storage operation unit (CPU 201) operating to store the data received by the reception unit in a data storage unit (RAM 202 and/or HDD 204).

The image forming unit performs image forming operation on the data for the specific file stored in the data storage unit based on the setting information in the case where the reception unit receives the information identifying the specific file and the setting information. In the case where the reception unit receives the data for the specific file and the setting information, the image forming unit performs image forming operation on the received data for the specific file based on the setting information.

Preferably the image forming apparatus further includes an input unit accepting input of information. Preferably the image forming unit performs image forming operation on the data for the file stored in the data storage unit under the condition that information is input to the input unit that is information for giving an instruction to print data of the file stored in the data storage unit.

Preferably, the data storage unit stores information identifying a user in association with data for each file. The information for giving an instruction to print data of the file stored in the data storage unit preferably includes information identifying a user stored in association with the data for the file to be printed in the data storage unit.

Preferably, the data storage unit further stores information specifying the user for each setting information in association with data for each file. Preferably the image forming apparatus further includes an erase unit (CPU 201) erasing data for a file stored in the data storage unit, and an erase instruction unit (panel operation unit 205) accepting input of information for instructing the erase unit to erase the data for the file. Preferably the erase unit erases the data for the file under the condition that the erase instruction unit receives an instruction to erase the data for the file, together with information identifying the user as stored in the data storage unit in association with the data for the file, or under the condition that a predetermined period has passed since the data for the file is stored in the data storage unit.

Preferably the data storage unit further stores, for each setting information and in association with the data for each file, information about whether the image forming operation is completed by the image forming unit. Preferably the erase unit erases the data for the file under the further condition that the data is associated with the information showing that the image forming operation is completed by the image forming unit, for all setting information associated with the data for the file.

Preferably the data for the file is data based on the file and data written in a page description language.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming system comprising:
an information terminal; and
an image forming apparatus connected to said information terminal via a network,
said image forming apparatus including a data storage unit storing a hash value of a file to be subjected to or having been subjected to image forming operation,
said information terminal including:
an acceptance unit configured to accept a print request to print a predetermined file;
a first generation unit configured to generate print data for printing said predetermined file by said image forming apparatus;
a second generation unit configured to generate a hash value of said predetermined file;
a determination unit configured to make a determination as to whether or not hash values stored by said data storage unit include the hash value generated by said second generation unit;
an information storage unit storing information about whether to allow said determination unit to make said determination; and
a transmission unit configured to transmit said print data and said hash value to said image forming apparatus only in a case where said determination unit determines that the hash values stored by said data storage unit do not include the hash value generated by said second generation unit, under a condition that said information storage unit stores information that said determination unit is allowed to make said determination, wherein
said transmission unit transmits said print data and said hash value to said image forming apparatus regardless of a result of the determination by said determination unit, under a condition that said information storage unit stores information showing that said determination unit is not allowed to make said determination, and
said image forming apparatus further including:
a reception unit configured to receive said print data and said hash value;
an image forming unit configured to perform an image forming operation based on said print data received by said reception unit; and
a storage operation unit configured to store, in said data storage unit, the hash value received by said reception unit.

2. The image forming system according to claim 1, wherein said transmission unit transmits said print data and said hash value to said image forming apparatus only in a case where said determination unit determines that hash values stored by said data storage unit do not include the hash value generated by said second generation unit,
said information terminal further includes an informing unit giving information that said determination unit determines that the hash values stored by said data storage unit include the hash value generated by said second generation unit in a case where said determination unit determines that the hash values stored by said data storage unit include the hash value generated by said second generation unit.

3. The image forming system according to claim 1, wherein said data storage unit further stores, in association with the hash value, print data about the file having the hash value,
said image forming apparatus further includes an input unit accepting input of an instruction to form an image for said print data received by said reception unit, and
said image forming unit performs image forming operation for the print data received by said reception unit in response to acceptance of said instruction by said input unit.

4. The image forming system according to claim 3, wherein said image forming apparatus further includes:
a file generation unit generating a file;
a print data generation unit generating print data about the file generated by said file generation unit; and
a hash value generation unit generating a hash value of the file generated by said file generation unit, and
said storage operation unit operates to store by said data storage unit the print data generated by said print data generation unit and the hash value generated by said hash value generation unit in association with each other.

5. The image forming system according to claim 1, wherein said print data is written in a page description language.

6. An image forming system comprising:
an information terminal; and
an image forming apparatus connected to said information terminal via a network,
said image forming apparatus including a data storage unit configured to store a hash value of a file to be subjected to or having been subjected to image forming operation,
said information terminal including:
- an acceptance unit configured to accept a print request to print a predetermined file;
- a first generation unit configured to generate print data for printing said predetermined file by said image forming apparatus;
- a second generation unit configured to generate a hash value of said predetermined file;
- a determination unit configured to make a determination as to whether or not hash values stored by said data storage unit include the hash value generated by said second generation unit;
- a decision unit configured to decide whether or not a data amount of said predetermined file is equal to or greater than a specific data amount; and
- a transmission unit configured to transmit said print data and said hash value to said image forming apparatus only in a case where said determination unit determines that the hash values stored by said data storage unit do not include the hash value generated by said second generation unit, under a condition that said decision unit decides that the data amount is equal to or greater than said specific data amount, and said transmission unit is further configured to transmit said print data and said hash value to said image forming apparatus regardless of a result of the determination by said determination unit, under a condition that said decision unit decides that the data amount is less than said specific data amount, and
said image forming apparatus further including:
- a reception unit configured to receive said print data and said hash value;
- an image forming unit configured to perform an image forming operation based on said print data received by said reception unit; and
- a storage operation unit configured to store, in said data storage unit, the hash value received by said reception unit.

7. An image forming system comprising:
an information terminal; and
an image forming apparatus connected to said information terminal via a network,
said image forming apparatus including a data storage unit storing a hash value of a file to be subjected to or having been subjected to image forming operation, data about the file to be subjected to or having been subjected to image forming operation and setting information for printing each file in association with each other,
said information terminal including:
- an acceptance unit configured accept a print request to print a predetermined file;
- a first generation unit configured to generate print data for printing said predetermined file by said image forming apparatus;
- a second generation unit configured to generate a hash value of said predetermined file;
- a determination unit configured to make a determination as to whether or not hash values stored by said data storage unit include the hash value generated by said second generation unit; and
- a transmission unit configured to transmit said print data and said hash value to said image forming apparatus only in a case where said determination unit determines that the hash values stored by said data storage unit do not include the hash value generated by said second generation unit; wherein said acceptance unit is further configured to accept a request to print a specific file,
said information terminal further includes a setting information generation unit configured to generate the setting information for printing said specific file,
said determination unit is further configured to determine whether or not the data stored by said data storage unit include the data about the specific file,
said transmission unit is further configured to transmit information identifying said specific file and the setting information generated by said setting information generation unit to said image forming apparatus in a case where said determination unit determines that the data storage unit stores said data about the specific file,
said transmission unit is further configured to transmit said data about the specific file and the setting information generated by said setting information generation unit to said image forming apparatus in a case where said determination unit determines that the data storage unit does not store said data about the specific file, and
said image forming apparatus further including:
- a reception unit configured to receive said print data and said hash value;
- an image forming unit configured to perform an image forming operation based on said print data received by said reception unit; and
- a storage operation unit configured to store, in said data storage unit, the hash value received by said reception unit,
- said reception unit is further configured to receive data transmitted from said information terminal,
- said storage operation unit is further configured to store, in said data storage unit, the data received by said reception unit,
- said image forming unit is further configured to perform an image forming operation for said data about the specific file stored by said data storage unit, based on said setting information, in a case where said reception unit receives said information identifying the specific file and said setting information, and
- said image forming unit is further configured to perform an image forming operation for said data about the specific file as received, based on said setting information, in a case where said reception unit receives said data about the specific file and said setting information.

8. The image forming system according to claim 7, wherein in a case where said reception unit receives said data about the specific file and said setting information, said storage operation unit operates to further store by said data storage unit said data about the specific file and said setting information as received, in association with each other, and
in a case where said reception unit receives said information identifying the specific file and said setting information, said storage operation unit operates to store by said data storage unit said setting information as received, in association with said data about the specific file.

9. The image forming system according to claim 7, wherein said data storage unit further stores a hash value in association with the data about each file having the hash value,
said information terminal further includes a hash value generation unit generating a hash value of said data about the specific file, and
said determination unit makes the determination about the hash value of said data about the specific file, instead of said data about the specific file.

10. A non-transitory recording medium having a computer executable image forming program recorded thereon, when executed by a computer connected via a network to an image forming apparatus storing a hash value of a file to be subjected to or having been subjected to image forming operation, performs operations comprising:
accepting a print request to print a predetermined file;
generating print data for printing said predetermined file by said image forming apparatus;
generating a hash value of said predetermined file;
storing information about whether to make a determination or not;
transmitting said print data and said generated hash value to said image forming apparatus if said information indicates that said determination is to be made and said determination determines that the hash values stored by said image forming apparatus do not include said generated hash value; and
transmitting said print data and said generated hash value to said image forming apparatus if said information indicates that said determination is not to be made, regardless of whether the hash values stored by said image forming apparatus include said generated hash value.

11. The recording medium according to claim 10, wherein under a condition that said print data and said hash value are transmitted to said image forming apparatus only in a case where it is determined that the hash values stored by said image forming apparatus do not include said generated hash value, when it is determined that the hash values stored by said image forming apparatus do not include said generated hash value, said computer executes said image forming program to further perform the step of giving information that it is determined that the hash values stored by said image forming apparatus do not include said generated hash value.

12. The recording medium according to claim 10, wherein said print data is written in a page description language.

13. A non-transitory recording medium having a computer executable image forming program recorded thereon, when executed by a computer connected via a network to an image forming apparatus storing a hash value of a file to be subjected to or having been subjected to image forming operation, performs operations comprising:
accepting a print request to print a predetermined file;
generating print data for printing said predetermined file by said image forming apparatus;
generating a hash value of said predetermined file;
making a determination as to whether or not hash values stored by said image forming apparatus include said generated hash value;
transmitting said print data and said hash value to said image forming apparatus when it is determined that the hash values stored by said image forming apparatus do not include said generated hash value;
determining whether or not a data amount of said predetermined file is not less than a specific data amount;
transmitting said print data and said hash value to said image forming apparatus under a condition that it is determined that said data amount is equal to or greater than said specific data amount and only in a case where it is determined that the hash values stored by said image forming apparatus do not include said generated hash value; and
transmitting said print data and said hash value to said image forming apparatus under a condition that it is determined that said data amount is less than said specific data amount, regardless of whether the hash values stored by said image forming apparatus include said generated hash value.

14. A non-transitory recording medium having a computer executable image forming program recorded thereon, when executed by a computer connected via a network to an image forming apparatus storing a hash value of a file to be subjected to or having been subjected to image forming operation, performs operations comprising:
accepting a print request to print a predetermined file;
generating print data for printing said predetermined file by said image forming apparatus;
generating a hash value of said predetermined file;
making a determination as to whether or not hash values stored by said image forming apparatus include said generated hash value;
transmitting said print data and said hash value to said image forming apparatus only in a case where it is determined that the hash values stored by said image forming apparatus do not include said generated hash value;
accepting a print request to print a specific file;
generating setting information for printing said specific file,
making a determination as to whether or not data stored by said image forming apparatus include data about said specific file;
transmitting information identifying said specific file and said generated setting information to said image forming apparatus in a case where it is determined that said image forming apparatus stores said data about the specific file; and
transmitting said data about the specific file and said generated setting information to said image forming apparatus in a case where it is determined that said image forming apparatus does not store said data about the specific file.

15. The recording medium according to claim 14, wherein said image forming apparatus further stores a hash value in association with data about each file having the hash value,
said computer executes said image forming program to further perform the steps of:
generating a hash value of said specific file; and
making said determination as to whether or not data stored by said image forming apparatus include data about said specific file on the basis of the hash value of data about a file.

16. The recording medium according to claim 14, wherein said data about the file is based on the file and written in a page description language.

17. An image forming apparatus connected via a network to an information terminal outputting a print request to print a predetermined file, comprising:

a data storage unit configured to store a hash value of a file to be subjected to or having been subjected to image forming operation, a reception unit configured to receive print data for printing said predetermined file and a hash value of said predetermined file transmitted from said information terminal;

a storage operation unit configured to store, in said data storage unit, said received hash value;

an image forming unit configured to perform image forming operation for said received print data;

said data storage unit is further configured to store data about the file to be subjected to or having been subjected to image forming operation and setting information about setting for printing each file, in association with each other, said reception unit is further configured to receive data transmitted from said information terminal, said storage operation unit is further configured to to store, in said data storage unit, the data received by said reception unit, in a case where said reception unit receives information identifying a specific file and said setting information, said image forming unit is further configured to perform an image forming operation for data about said specific file stored by said data storage unit, and in a case where said reception unit receives said data about the specific file and said setting information, said image forming unit is further configured to perform an image forming operation for said received data about the specific file based on said setting information.

18. The image forming apparatus according to claim 17, wherein said data storage unit stores, in association with the hash value, print data about the file having the hash value, said enrage forming apparatus further comprises an input unit accepting input of an distinction to form an image for the print data stored by said data storage unit, and in response to acceptance of said instruction by said input unit, said image forming unit performs image forming operation for the print data stored by said data storage unit.

19. The image forming apparatus according to claim 18, further comprising:

a file generation unit generating a file, a print data generation unit generating print data about the file generated by said file generation unit; and a hash value generation unit generating a hash value of the file generated by said file generation unit, wherein said storage operation unit operates to store by said data storage unit the print data generated by said print data generation unit and the hash value generated by said hash value generation unit in association with each other.

20. The image forming apparatus according to claim 17, wherein said print data is written in a page description language.

21. The image forming apparatus according to claim 17, wherein said storage operation unit operates to store by said data storage unit said data about the specific file and said setting information as received, in association with each other, in a case where said reception unit receives said data about the specific file and said setting information, and said storage operation unit operates to store by said data storage unit said setting information as received, in association with said data about the specific file, in a case where said reception unit receives said information identifying the specific file and said setting information.

22. The image forming apparatus according to claim 17, wherein said data storage unit further stores a hash value in association with the data about each file having the hash value.

\* \* \* \* \*